United States Patent Office 3,451,508
Patented June 24, 1969

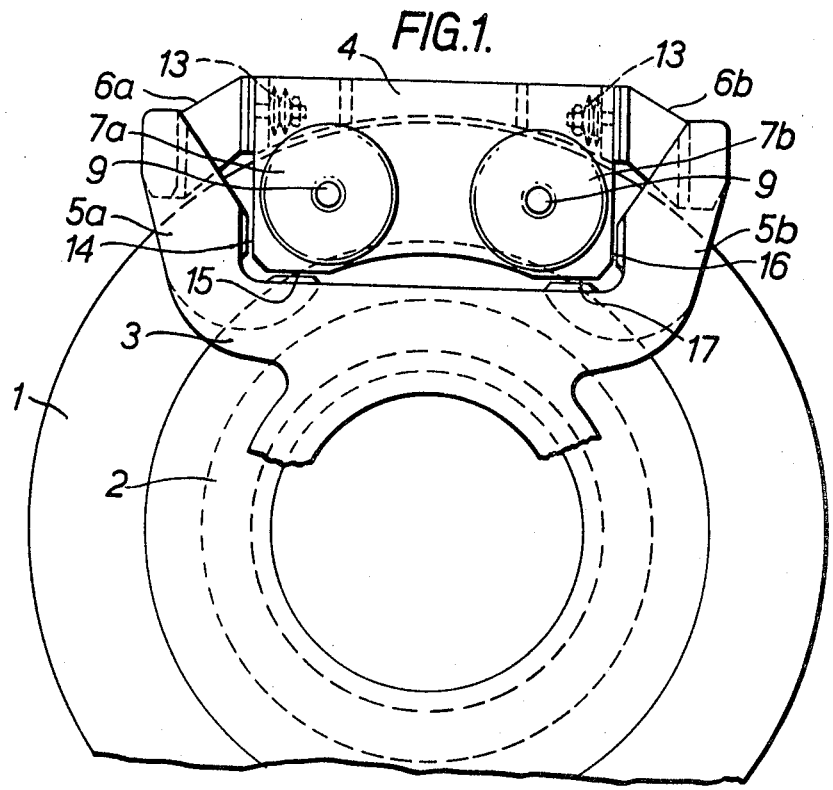
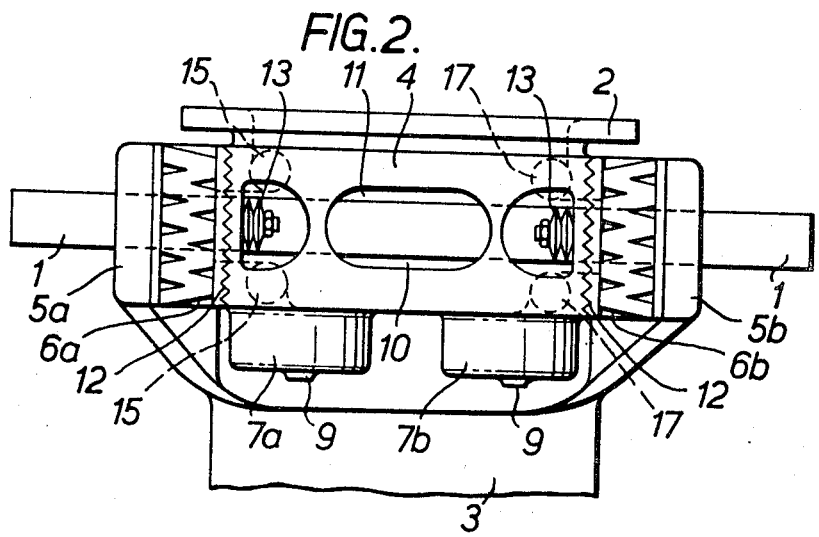

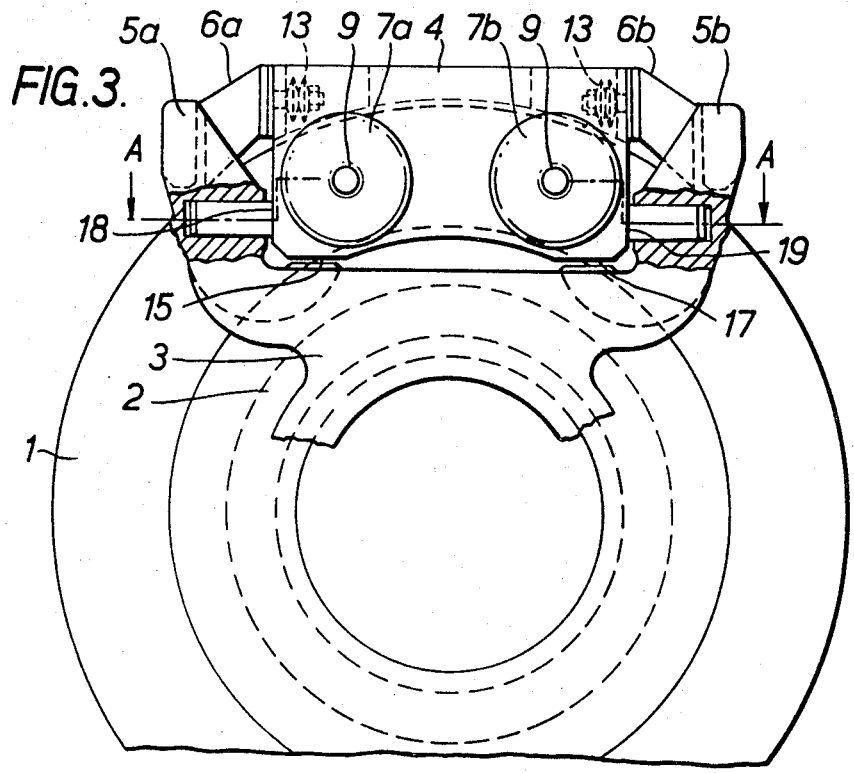
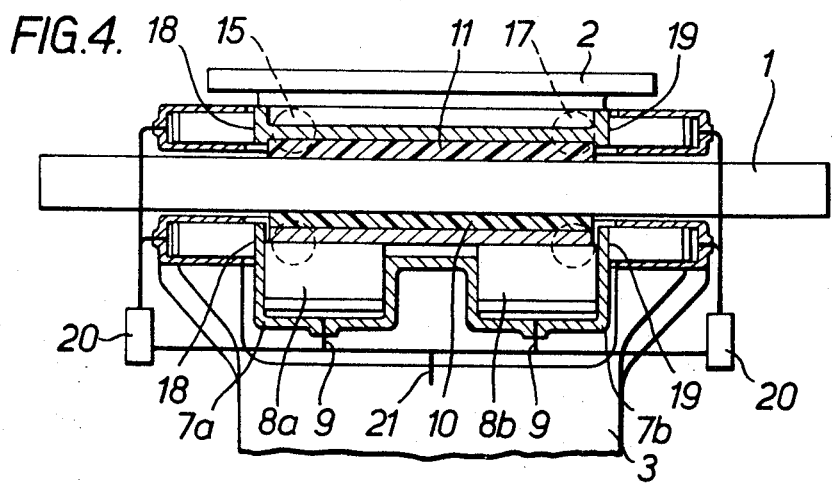

3,451,508
SPOT TYPE DISC BRAKES HAVING
A FLOATING SADDLE
Hans Reinhard Ehlers, Reinbek, Germany, assignor to
Jurid Werke G.m.b.H., Glinda, Germany
Filed Dec. 7, 1967, Ser. No. 688,828
Claims priority, application Germany, Dec. 9, 1966,
J 32,459
Int. Cl. F16d 55/00, 65/38
U.S. Cl. 188—73                                    4 Claims

ABSTRACT OF THE DISCLOSURE

A spot-type disc brake has a floating saddle which is connected to and supported on a frame by means of resilient connections by which the saddle is guided in its floating motion relative to the frame axially of the disc brake.

---

The invention relates to a spot type disc brake having a floating brake saddle, that is to say a saddle which is axially displaceable in relation to the brake disc.

The advantage of this kind of brake lies particularly in the fact that such a brake requires operating means, e.g. hydraulic brake pistons, only on one side of the brake disc. As soon as the piston on the one side presses against the brake lining, the saddle is axially displaced by the force of reaction and thus the brake lining on the other side of the brake disc is also applied. The saddle moves in sliding guides, for example parallel bolts or rails, or in tubes, which are secured to the machine frame or chassis.

Brakes of this general type are not frequently made use of, although they are simpler than conventional fixed saddle brakes. This is due to the considerable disadvantages of the known guides employed in such brakes.

If the tolerance of the guide is too small penetration of very small amounts of dirt or a very small distortion caused by the braking heat will jam the saddle in the guide.

But, if the tolerance is too great, then the saddle easily tilts during operation and the brake becomes unserviceable. In addition thereto the guide is worn out after a very short time as a result of the unavoidable friction vibration. The result is an undesirable chattering during each braking and the tendency to jam is increased.

It is the object of the invention to overcome all these drawbacks.

Therefore a partially lined disc brake with a floating saddle is characterised according to the invention by the provision of rubber-elastic elements, which are connected to the brake saddle and the frame, for securing and guiding the brake saddle.

These elements can be of the general type of known rubber-metal-connections and, for easier assembly, they can be separate construction components. In such a case the rubber-elastic part is fixedly secured, on two opposite sides, to metal parts, which in turn are connected to the brake saddle and to the frame, respectively.

When operating the brake the saddle, which is held by the rubber elements, is actuated and the rubber elements are deflected. Advantageously, the brake saddle is returned by the elasticity of the rubber elements. Since there are no sliding guides the brake cannot become unserviceable due to wear of such guides. Friction vibrations which might occur in the saddle are damped by the rubber-elastic elements thus impeding their further transmission.

It is advantageous to provide supporting shoulders on the saddle and suitable contact surfaces for the supports on the frame, in order to limit the twisting of the brake saddle during the actuation of the brake. Since there is sufficient tolerance between the supporting members and their contact surfaces opposite, and since they have no guiding function, accumulating dirt cannot do any harm.

A preferred embodiment of the invention is characterised in that hydraulically operated thrust pieces are provided on the contact surfaces of the supporting members. In this construction a support preventing backlash is ensured in that pistons guided in cylinders are subjected to the brake pressure, possibly with time delay, as a result of which the brake saddle is braced against the opposite contact surfaces.

Further objects and advantages of the present invention will become apparent from the following description and the accompanying drawings.

In the drawings:

FIG. 1 is a partial view of a spot-type disc brake having a floating saddle according to the invention;

FIG. 2 is a view of the disc brake of FIG. 1 seen from the top;

FIG. 3 is a partial view of another embodiment of a disc brake according to the invention;

FIG. 4 is a view of section A—A of FIG. 3, seen from the top.

FIG. 1 illustrates a friction disc 1 with a mounting flange 2, which is rigidly connected to a shaft to be retarded (not illustrated). A brake bracket 3 secured to the frame of the vehicle or machine supports a brake saddle 4 on arms 5a and 5b.

According to the invention rubber-elastic connection members 6a and 6b are provided between the brake saddle 4 and the arms 5a and 5b, which support and guide the brake saddle. These rubber-elastic connection members 6a and 6b can for example be made of known rubber-metal elements, in which natural or a synthetic rubber piece and a material with a high modulus of elasticity, e.g. steel, are fixedly connected on opposite surfaces to form a structural member. The steel material serves for fastening the connection member at the brake bracket arm and at the brake saddle, respectively.

For actuation of the brake, the brake saddle 4 is provided with brake cylinders 7a and 7b and pistons 8a and 8b which are operated by oil pressure. Connections 9 supply the hydraulic fluid to the cylinders. As soon as pressure is applied to the pistons they press a first brake shoe 10 against the brake disc 1. Due to the reaction force, the brake saddle 4 is axially displaced and a second brake shoe 11, which is located opposite the first brake shoe 10 on the other side of the brake disc 1, is also pressed against the brake disc 1 by the brake saddle 4. Due to the axial displacement of the brake saddle 4 the connection members 6a and 6b are resiliently stretched in the direction of thrust, so that the brake saddle 4 returns to its initial position when the pressure is released.

In order to make up for the wear of the friction linings of the brake shoes 10 and 11, the connection members 6a and 6b are displaceably mounted relative to the brake saddle 4 by means of toothed strips 12, and plate springs 13 induce the required contact pressure.

Another possibility, for dealing with wear, is to replace the toothed strip by frictional engagement between the members 6a and 6b, and the saddle 4.

According to the invention bearing faces for the supporting shoulders 14, 15, 16 and 17 ensure that the connection members 6a and 6b are mainly subjected to thrust when braking, and torques on the brake saddle 4 are taken up by the brake brackets 3. The construction can be further improved in some cases by providing resilient damping elements at these points.

In a preferred embodiment of the invention illustrated in FIGS. 3 and 4, hydraulically operated thrust pieces 18 and 19 are provided at the contact surfaces of the supporting members 14 and 16. For reasons of clarity the hydraulic members for the thrust pieces 18 and 19 are shown in the brake brackets 3.

For the conduction of the hydraulic fluid, embodiments in which all hydraulic elements are housed in the brake saddle 4 are especially advantageous. In the preferred embodiment there are also restrictors 20, for example nozzles as retardation elements, interconnected in the pipe between the brake cylinders 7a and 7b and the hydraulic elements of the thrust pieces 18 and 19. A common connection for hydraulic fluid is designated by 21.

In cases, in which one direction of rotation of the shaft to be retarded is most common, for example in vehicles, the construction is simplified if hydraulically operated thrust pieces are provided only on one side of the saddle, so that only the thrust pieces 18 have to be provided when the direction of rotation is to the right as seen in FIG. 4.

I claim:

1. A spot-type disc brake comprising a frame, a brake saddle mounted on said frame and displaceable in an axial direction relative to the brake disc, and resilient connecting means connecting said brake saddle to said frame for movement of said saddle relative to said frame against the influence of said resilient connecting means in said axial direction, said resilient connecting means forming the only connection between said saddle and frame and comprising elastic deformable elements sandwiched between plates, each plate having two opposite end surfaces, said end surfaces bearing against connecting surfaces of said frame and said brake saddle, one of said end surfaces and the corresponding said connecting surface having complementary serrated interengaging profiles.

2. A spot type disc brake according to claim 1, wherein the resilient connecting means are of rubber and said plates are of steel.

3. A spot type disc brake according to claim 1, wherein supporting shoulders are provided on the brake saddle.

4. A spot type disc brake according to claim 3, wherein rubber-elastic damping elements are provided at the point of the supporting shoulders.

References Cited

UNITED STATES PATENTS

| | | | |
|---|---|---|---|
| 3,100,553 | 8/1963 | Butler | 188—73 |
| 3,199,635 | 8/1965 | Bessler et al. | 188—73 |
| 3,256,959 | 6/1966 | Eggstein | 188—73 |
| 3,299,991 | 1/1967 | De Castelet | 188—73 |

FOREIGN PATENTS 953,520 3/1964 Great Britain.

GEORGE E. A. HALVOSA, *Primary Examiner.*

U.S. Cl. X.R.

188—196